May 2, 1933. R. E. GROSSMANN 1,906,791
FISH LURE
Filed April 9, 1932
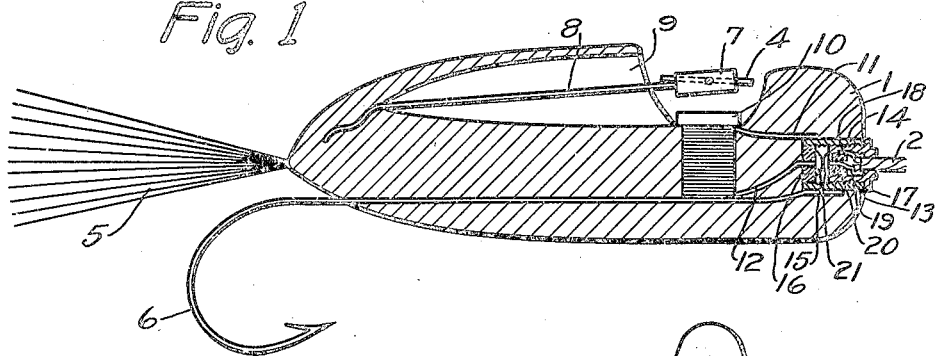
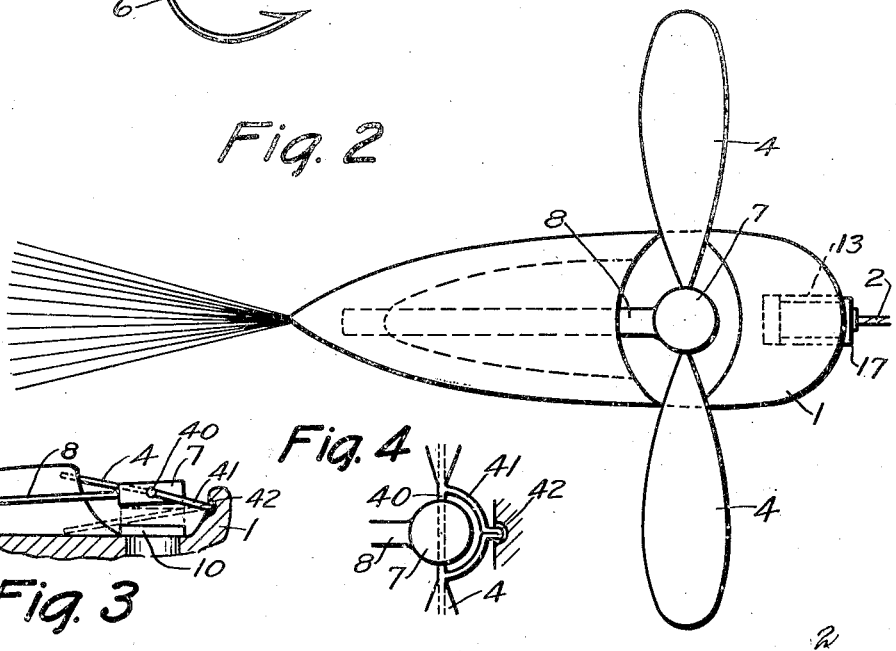
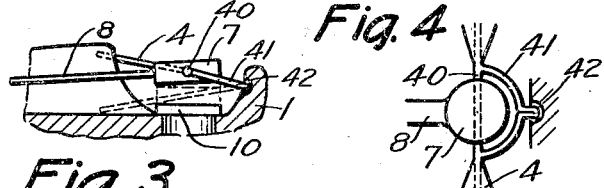
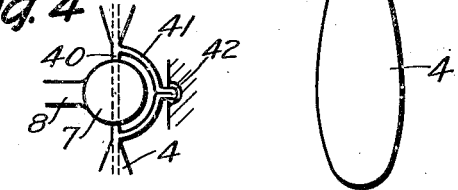
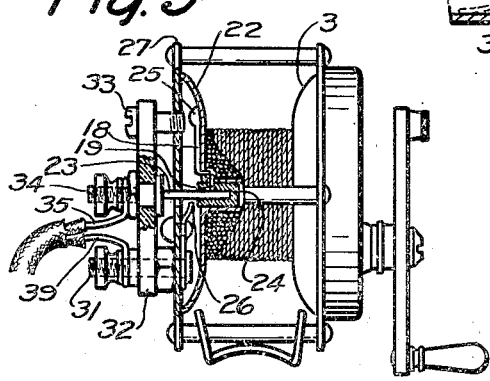
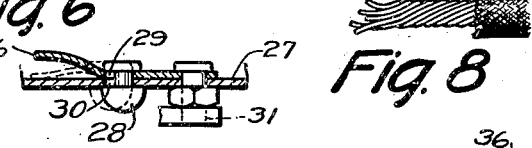
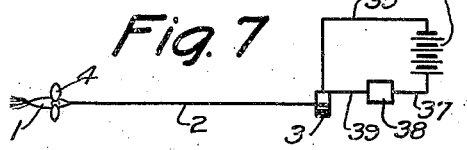
INVENTOR
Roy E. Grossmann
Harry Bowen
ATTORNEY Patented May 2, 1933

1,906,791

UNITED STATES PATENT OFFICE

ROY EDWARD GROSSMANN, OF SEATTLE, WASHINGTON

FISH LURE

Application filed April 9, 1932. Serial No. 604,319.

The invention is a fish lure in which parts thereof are mechanically operated to produce a life-like motion by an electric circuit through the fishing line to which the lure is connected.

The object of the invention is to provide an electrically operated fish lure.

Another object of the invention is to provide a fish lure in which parts thereof have a natural life-like movement and are operated from a remote point through the line.

Another object of the invention is to provide means for electrically operating a fish lure through the fishing line.

A further object of the invention is to provide an electrically operated fish lure which may be given a continuous motion automatically from the point at which the line is held.

And a still further object of the invention is to provide an electrically operated fish lure that is operated through the line and which is of a simple and economical construction.

With these ends in view the invention embodies a fish lure or bait having parts thereof electrically operated through a line to which the lure is attached by operating devices in the boat or at the point at which the line is held.

Other features and advantages of the invention will appear from the following description taken in connection with the drawing, wherein:—

Figure 1 is a view showing a longitudinal section through the lure or bait.

Figure 2 is a plan view of the lure or bait.

Figure 3 is a detail showing an alternate arrangement of the operating parts as shown in Figure 1.

Figure 4 is a detail showing a plan view of the parts shown in Figure 3.

Figure 5 is a view showing a construction of a reel to which the line is attached.

Figure 6 is a detail showing a switch or contact in combination with the reel.

Figure 7 is a view showing a preferred arrangement of the circuit.

Figure 8 is a detail showing the wire.

In the drawing the lure is shown as it would be made wherein numeral 1 indicates the body of the lure, numeral 2, the line, and numeral 3, the reel.

The lure may be of any shape or design and may be arranged to imitate any kind of animal or object with any members or parts extending therefrom, or with the body itself moved or operated by electrical devices or impulses. It will also be understood that the parts may have a reciprocating, or up and down movement as shown in Figure 1 or may have a rotary movement as shown in Figure 3.

In the device shown the body 1 may be made as shown with wings 4 extending from the sides and a tail 5 at the rear end. A hook 6 also extends from the body below the tail, however, it will be understood that this hook may be located at any suitable point and any number of hooks may be used as may be desired. The wings 4 are attached to a member 7 which may be made of metal having magnetic attraction and this member is supported on a spring 8 which is positioned in an opening 9 in the member 1 and secured therein by extending into the body as shown or in any suitable manner. Below the member 7 is a magnet 10 which, in the design shown is formed by a solenoid, however, it is understood that any electrically operated magnet may be used. The two contacts of the solenoid are connected by wires 11 and 12 to a socket 13 which is similar to a lamp socket with the wire 11 connected to a threaded shell 14 and the wire 12 connected to a contact 15 which is held in an insulating washer 16 as shown.

A plug 17 is provided at the outer end of the line which is threaded into the socket 13 as shown in Figure 1 and it will be noted that the line is provided with two fine insulated wires with one, 18, connected to the shell of the plug 17 and another, 19, extending through an insulating sleeve 20 to a contact 21 at the inner end the socket.

The opposite end of the line is connected to the reel as shown in Figure 5 with the wire 18 connected to the reel rotor 22 and the wire 19 connected to a pin 23 which is mounted in an insulating sleeve 24 in the center of the rotor as shown. A button 25 may be provided on the rotor which may engage a contact 26 on the reel frame 27 when the member 26 is in the upper or free position. When it is desired to break the circuit the button 28 which is mounted in slots 29 and 30 in the member 26 of frame 27, as shown in Figure 6, is moved from the full line position to that shown in dotted lines so that the inner end of the button will draw the member 26 downward so that it will not engage the button 25. It will also be noted that in order to break the contact it is only necessary to turn the reel slightly and when it is desired to complete the circuit the wheel may be permitted to run free until the member 25 engages the member 26 with the member 26 in the free position as shown in Figure 6. The member 26 is attached to the frame and also contacts a pin 23 to which is attached an insulating bar 32, the opposite end of which may be held to the frame 27 by a screw 33. In the center of this insulating member 32 is another post 34, the inner end of which engages the end of the pin 23, as shown in Figure 5. A wire 35 may be connected to the post 34 and may extend to a battery 36 as shown in Figure 7, and the battery may be connected by a wire 37 to a mechanical interrupter 38, which may be of any suitable design and operated in any desired manner. The interrupter may then be connected by a wire 39 to the post 31 so that it will be connected to the reel frame and rotor which in turn will connect it to the wire 18.

A circuit may then be completed, with the members 25 and 26 in engagement, from one terminal of the battery 36 through wire 35 to post 34, pin 23, wire 19, through the fishing line to plug 17, through contacts 21 and 15 to wire 12 through the solenoid, and then through wire 11, shell 14, through the plug 17 to wire 18, again through the line to contact point 25 on the reel, through contacts 25 and 26 to post 31, through wire 39 to interrupter 38, and through wire 37 to the opposite terminal of the battery 36. With this circuit completed and the interrupter operating to make and break the circuit at intervals the solenoid will attract and release the member 7 intermittently so that this member will move upward and downward and give the wings 4 a life-like motion.

It will also be noted that with the wings 4 mounted in the member 7 upon a pin 40 as shown in Figures 3 and 4 and with the pin 40 rotatably mounted in the member 7 and provided with an extension 41 engaging a socket 42 in the body 1 the wings will have a slight rotary motion as the member 7 moves upward and downward as indicated by the dotted lines shown in Figure 3.

It will be understood that the reel 3 may be of any suitable type, design, or arrangement and also that the wire may be connected through it in any suitable manner.

It will be understood that changes may be made in the construction without departing from the spirit of the invention. One of which changes may be in the use of other mechanical means for imparting an electric impulse to moving parts of the lure, another may be in the use of other means of forming a complete circuit between the lure and the point at which the line is held, another may be in the use of other means for attaching the lure to the line, and still another may be in the use of other means for attaching the line to the reel. It will also be understood that the interrupter may be omitted and the circuit made and broken by hand or any manual means.

The construction will readily be understood from the foregoing description. In use the tackle may be provided as shown and described and with the lure attached to the end of the line it may be cast in the usual manner and when it is in position, or in a desired spot, as over a bass hole, the interrupter may be started or the circuit made and broken so that the solenoid will draw the member 7 downward, and the spring moving it upward so that the wings, or other parts thereof, may move upward and downward, thereby imparting a life-like motion to the lure. The tackle may, otherwise be operated in the usual manner.

The line may be so constructed that it will wind upon the reel or readily unwind to permit casting, or reeling it in in the usual manner. It is preferred to make the line of a plurality of fine enameled wires in a textile covering with half of the wires carrying one circuit or forming wire 18, and the other half carrying the other circuit or forming wire 19 as hereinbefore described. The wires are preferably twisted as shown so that as the covering stretches, in taking the strain the wires will straighten and not stretch. It is appreciated that the section of the line shown in Figure 8 is considerably magnified as in reality the small wires are very fine and with the covering do not form a line that is larger than an ordinary fishing line of the same type.

Having thus fully described the invention, what I claim as new and desire to secure by Letters Patent, is:—

1. In a fish lure, a body portion, parts extending from said body portion, a solenoid in said body portion, a metallic member positioned above said solenoid and adapted to be attracted thereby, a spring for resiliently supporting said metallic member attached to said extending parts of the lure, and means for energizing said solenoid from a remote point.

2. A fish lure comprising a body portion with parts and a hook extending therefrom, a line attached to said body portion, electrical means for moving extending parts of said body portion in one direction and resilient means for moving said extending parts in the opposite direction.

In testimony whereof I affix my signature.

ROY EDWARD GROSSMANN.